Feb. 25, 1958 R. B. JOHNSON ET AL 2,824,513

POSITIONING MECHANISM IN SELECTIVE TYPE PRINTING MACHINE

Filed Sept. 8, 1955 5 Sheets-Sheet 1

INVENTORS:
REYNOLD B. JOHNSON
PAUL L. PECCHENINO

By- John B. Sponsler
AGENT

| | | | | | | | | | | | | | |
|---|---|---|---|---|---|---|---|---|---|---|---|---|---|
| | 8 | 8 | 8 | 8 | 8 | 4 | 4 | 4 | 4 | 2 | 2 | 1 | |
| | 4 | 2 | 2 | 1 | | 2 | 2 | 1 | | 1 | | | |
| | | 1 | | | | 1 | | | | | | | |
| | @ | # | | 9 | 8 | 7 | 6 | 5 | 4 | 3 | 2 | 1 | * |
| Y | * | $ | | R | Q | P | O | N | M | L | K | J | - |
| Z | 0 | . | | I | H | G | F | E | D | C | B | A | & |
| YZ | % | , | | ‡ | Y | X | W | V | U | T | S | / | 0 |
FIG. 8
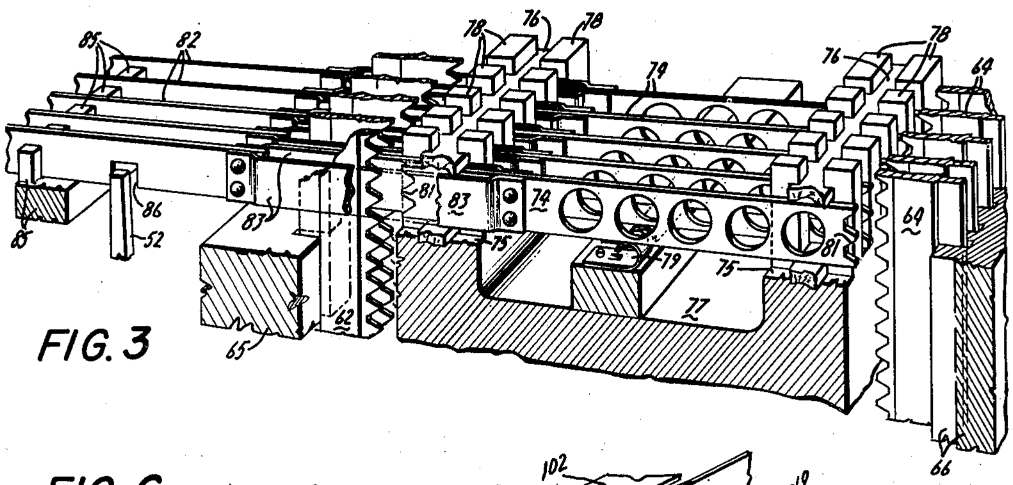
FIG. 3
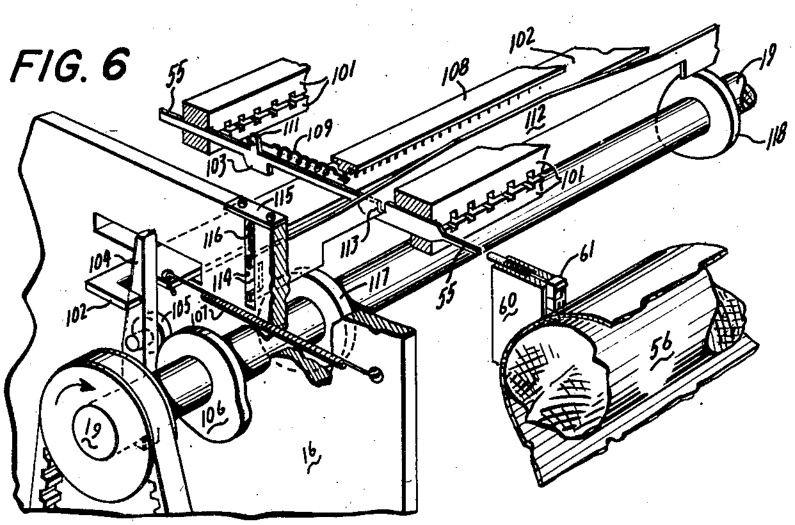
FIG. 6

RESET

NON-SELECT

SELECT

United States Patent Office 2,824,513
Patented Feb. 25, 1958

2,824,513

POSITIONING MECHANISM IN SELECTIVE TYPE PRINTING MACHINE

Reynold B. Johnson, Palo Alto, and Paul L. Pecchenino, Santa Clara, Calif., assignors to International Business Machines Corporation, New York, N. Y., a corporation of New York Application September 8, 1955, Serial No. 533,212

9 Claims. (Cl. 101—93)

This invention relates to apparatus for the selective control of printing elements or type bars and the like. An object of this invention is to provide an improved mechanism in which a plurality of type bars are positioned to a predetermined print position in accordance with the existence or nonexistence of pulses at cyclic times during each cycle of operation by causing one or the other of two members of a differential type bar moving mechanism to be held in a locked position.

A further object of the invention is to provide a binary actuated type bar setup mechanism in which a differential type bar moving mechanism is caused to go through cyclic operations involving dwells and rises of a driving member of the differential in such a way that the presence or absence of a binary signal during a dwell will cause one of two driven members of the differential to be locked during a following rise operation of the cycle, thereby selectively imparting motion to the type bar during that rise operation so that a predetermined type slug is finally moved to a printing position in accordance with binary signals during the dwell operations of each cycle.

Another object of the invention is to provide an improved type bar positioning mechanism.

A still further object of the invention is to provide an improved type bar positioning mechanism in a parallel printer which is capable of printing lines of characters in response to a parallel input of information.

A still further object of the invention is to provide a printing mechanism employing a linear differential type bar moving mechanism.

Still another object of the invention is to provide a printing mechanism in which character selection is accomplished by the selection of one or the other of two parts of a differential mechanism during each of a series of phases of movement of the differential mechanism.

Another object is to provide a parallel printer which is controlled by the presence and absence of pulses during predetermined time intervals in which the status of information affects the movement of one or the other of two movable complements of a differential system during the controlled time phase allotted for each pulse.

Another object of the invention is to provide a binary input device arranged to receive parallel lines of binary coded pulses in sequential order and to additively store the information by the mechanical positioning of a type bar.

A further object is to provide a cyclic printing mechanism responsive to binary coded information arranged to additively store information received during timed intervals by displacement of a type bar mechanism.

Still a further object is to provide a printer employing a differential mechanism to affect displacement of a print bar in which a selection may be made to cause either displacement or nondisplacement of the type bar during discrete cycles of the differential mechanism wherein such selections are enabled to be made during static phases of the differential operation.

Other objects of the invention will be pointed out in the following description and claims and illustrated in the accompanying drawings which disclose, by way of example, the principle of the invention and the best mode which has been contemplated of applying that principle.

In the drawings:

Fig. 3 is an enlarged perspective view of a type bar locking mechanism of Fig. 1.

Figure 1:
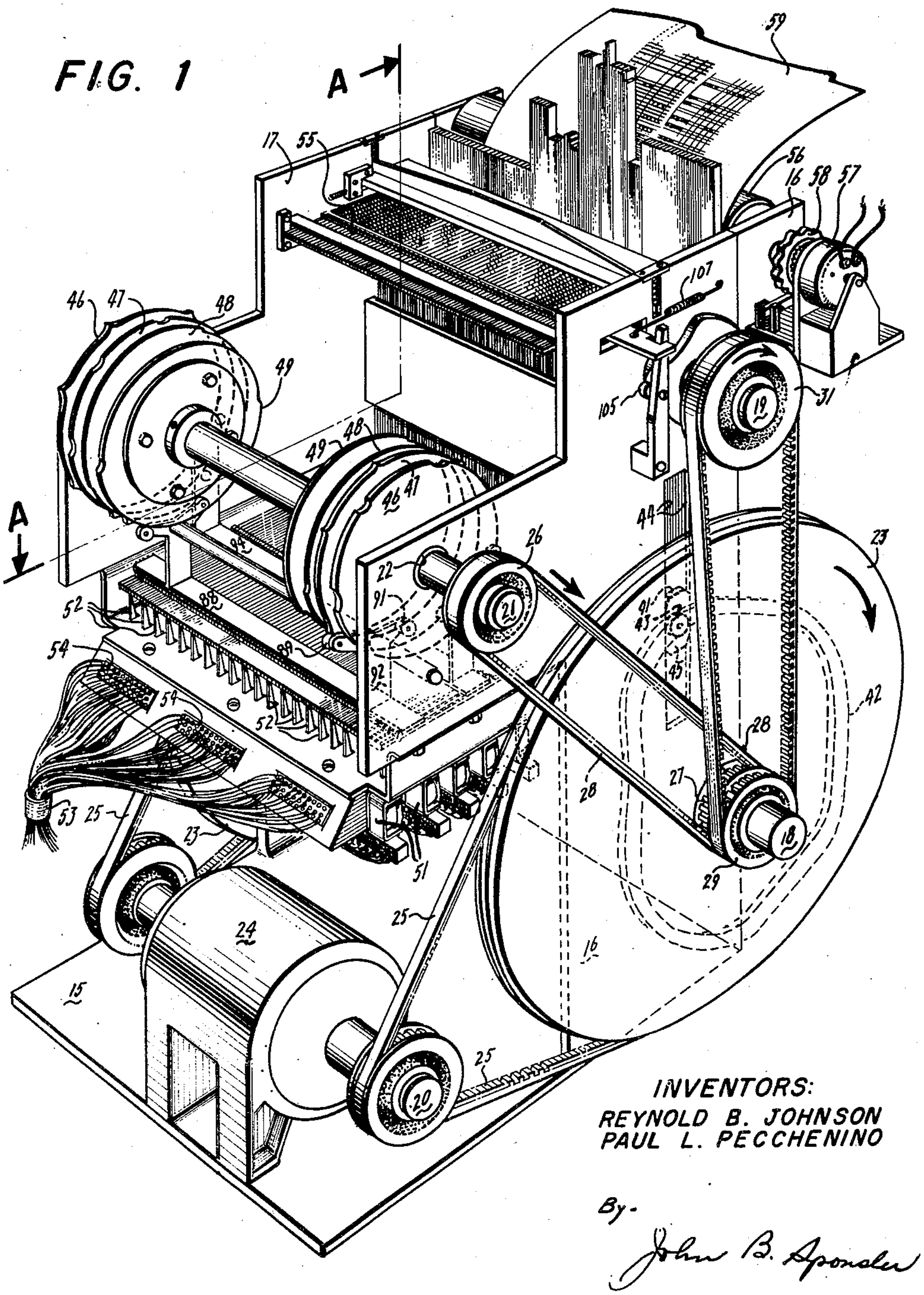
Fig. 1 is a perspective view of a machine showing the principles of the invention.
Figure 4A:
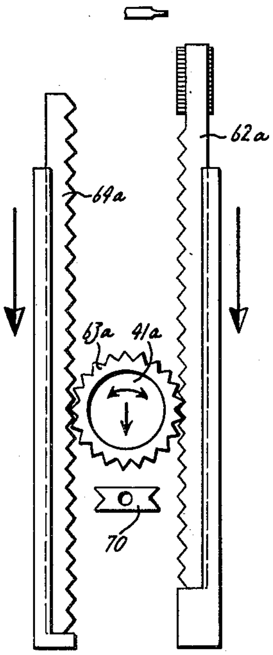

Fig. 4*a* is a schematic view of selected elements of Fig. 1 showing the relative relationship during a reset cycle of the machine.

Figure 4B:
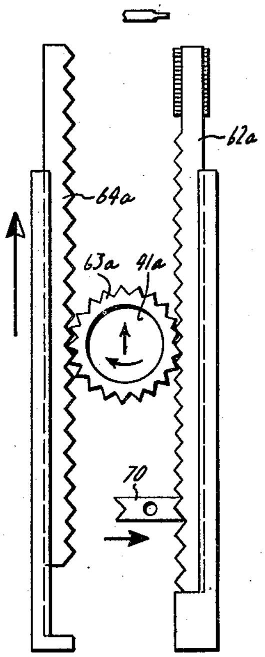

Fig. 4*b* is a schematic view of the selective elements of Fig. 4*a* showing the relative relation of the elements during a nonselect condition.

Figure 4C:
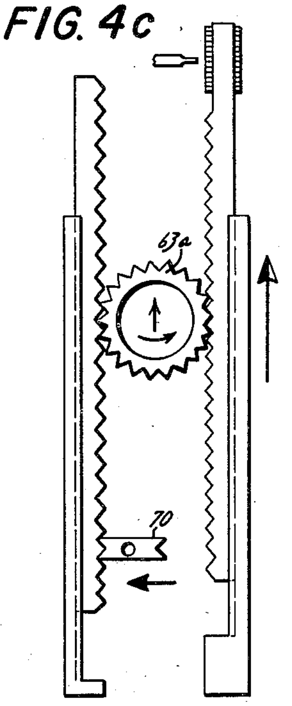

Fig. 4*c* is a schematic view of the selected elements of Fig. 4*a* showing the relative relation of the elements during a select condition.

Figure 5:
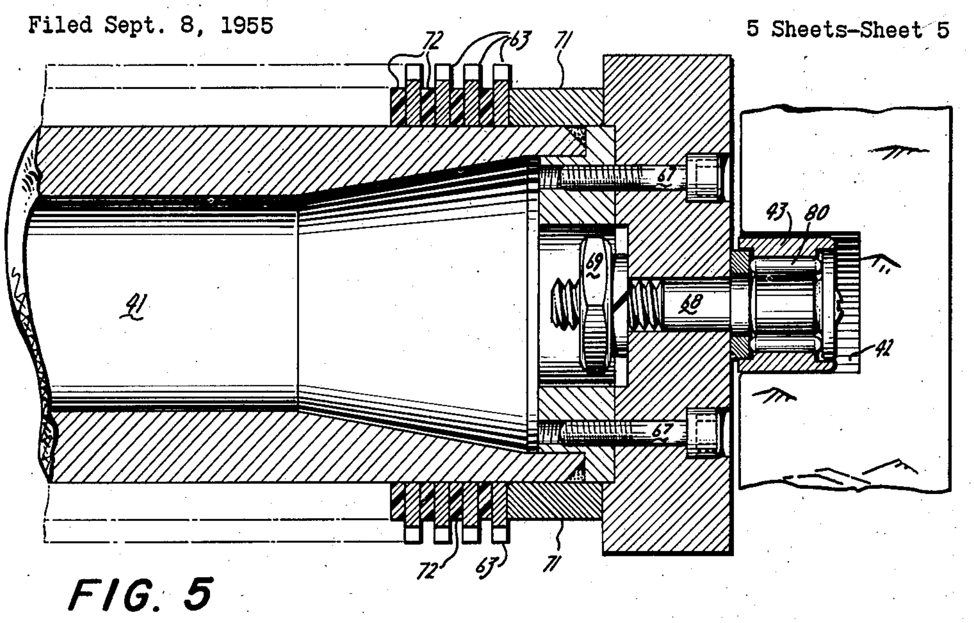

Fig. 5 is an enlarged sectional view of a transport mechanism of Fig. 1 taken at line B—B.

Fig. 6 is an enlarged perspective view of a print hammer mechanism of Fig. 1.

Figure 7:
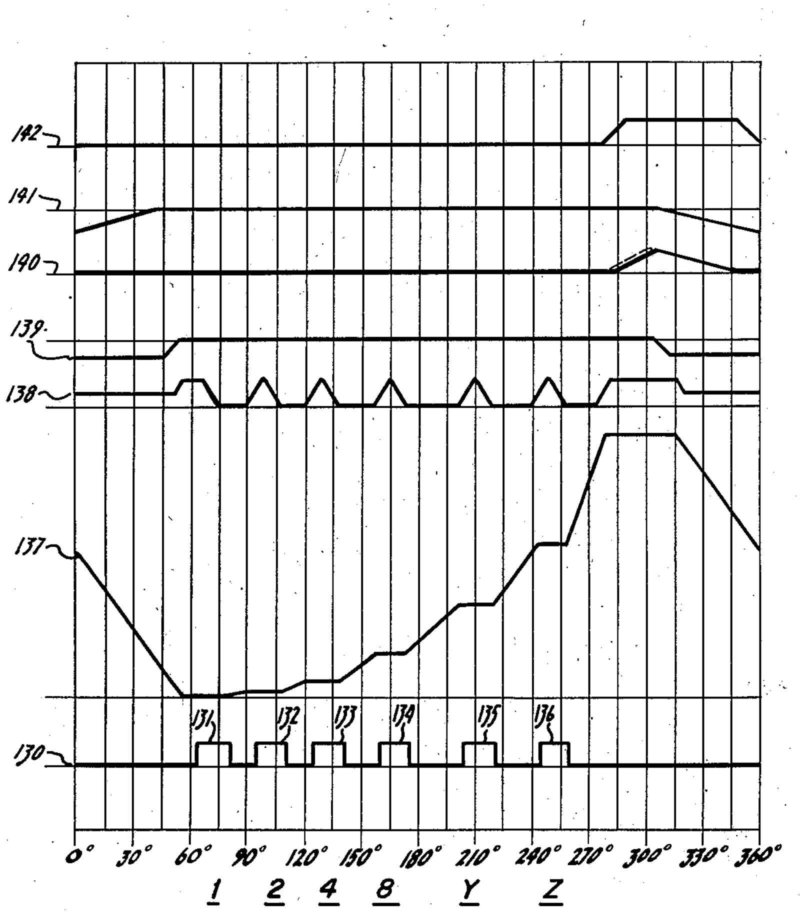

Fig. 7 is a timing chart depicting the relative movement and time sequence of selected elements of Fig. 1.

Fig. 8 is a coding chart depicting the positions of characters in a print position obtainable with the machine for various combinations of informational input.

Figure 9A:
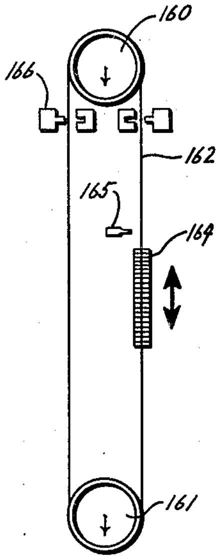

Fig. 9*a* is a schematic view of selected parts of another embodiment of the invention shown in a reset condition.

Figure 9B:
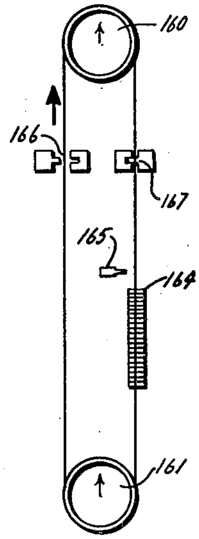

Fig. 9*b* is a schematic view of the selected parts of Fig. 9*a* shown in a nonselect condition.

Figure 9C:
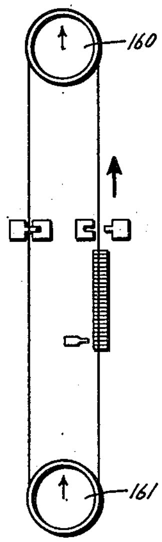

Fig. 9*c* is a schematic view of the selected parts of Fig. 9*a* shown in a select condition.

Referring to Fig. 1, a printing mechanism is provided with a frame having a bottom plate 15, a right side plate 16, and a left side plate 17. Three shafts, a main shaft 18, a print hammer cam shaft 19, and a cam shaft 21 are journaled between side plates 16 and 17 by bearings 22 associated with each of the shafts. A main drive shaft wheel 23 is attached to each end of the drive shaft 18 and is powered by a motor 24 affixed to the bottom plate 15. Power is transmitted from the motor 24 to the wheels 23 via belt 25 and a pulley 20 directly driven by the motor 24. The ends of the shaft 18 are also provided with main cam shaft idler pulleys 27 which drive a driven pulley 26 on the main cam shaft 21 via belts 28. In similar fashion, print hammer cam idlers 29 are attached to the end of shaft 18 to drive the print hammer cam shaft 19 via driven pulley 31 and belts 32. The belts 32 and 28 are provided with lands and grooves on the inside portion thereof which interact with complementary lands and grooves on the outer surface of the pulleys 26, 27, 29 and 31. The lands and grooves are provided to prevent slippage between belt and pulley so that constant timing relationship is maintained between the shafts 18, 19 and 21.

A pinion support tube 41 for a type bar differential mechanism (hereinafter fully explained) is supported to run between the two side plates 16 and 17 in grooves 42 provided on the inside surface of the wheels 23. The ends of the tube 41 are provided with an axially mounted roller 43 which rides in the groove 42. The side plates 16 and 17 are each provided with a vertical cut 44 wide enough to accommodate a guide block 45. The blocks 45 are attached to each end of the tube 41 just inside the rollers 43 to ride in the cut 44 and prevent horizontal movement of the tube. The tube 41 is therein cammed to move vertically corresponding to variations in the contour of the grooves 42. The tube 41, therefore, will rise and fall in accordance with the shape of the grooves 42 as the wheels 23 are rotated. The groove 42 on each wheel 23 is complementary so that the tube 41 is always mounted parallel to the bottom plate 15.

The cam shaft 21 is provided with two identical sets of cams 46, 47, 48 and 49 with each set being located near the side plates 16 and 17, respectively. A bank of magnets 51 is mounted under the shaft 21 in five rows of 24 magnets each. Each magnet 51 is provided with an armature 52 which, when energized, is arranged to be pulled away from the vertical axis of motion of tube 41. Each row of the magnets 51 is laterally displaced with respect to the other rows to provide an offset so that the lateral distance between armatures 52 is approximately equal. There are, therefore, 120 armatures between the side plates 16 and 17, arranged so that one armature is in a position of alignment for each print station due to the relative staggering of the five rows of magnets 51. The magnets 51 are individually provided with electrical energization from panels 54 through a cable of wires 53.

The top section of the printer between the side plates 16 and 17 is provided with a row of print hammers 55 and the associated mechanism needed for the print hammers to be activated. A platen 56 is provided opposite the hammers 55. The platen 56 is of conventional design, being rubber coated and arranged to advance a part of a revolution equal to a line spacing by the actuation of a solenoid actuated leadex element 57. A ball detent mechanism 58 is provided to keep the platen 56 in a more exact detented position. Paper 59 is held to the platen 56 by rollers 50 (Fig. 2) in contact with the platen 56.

Figure 2:
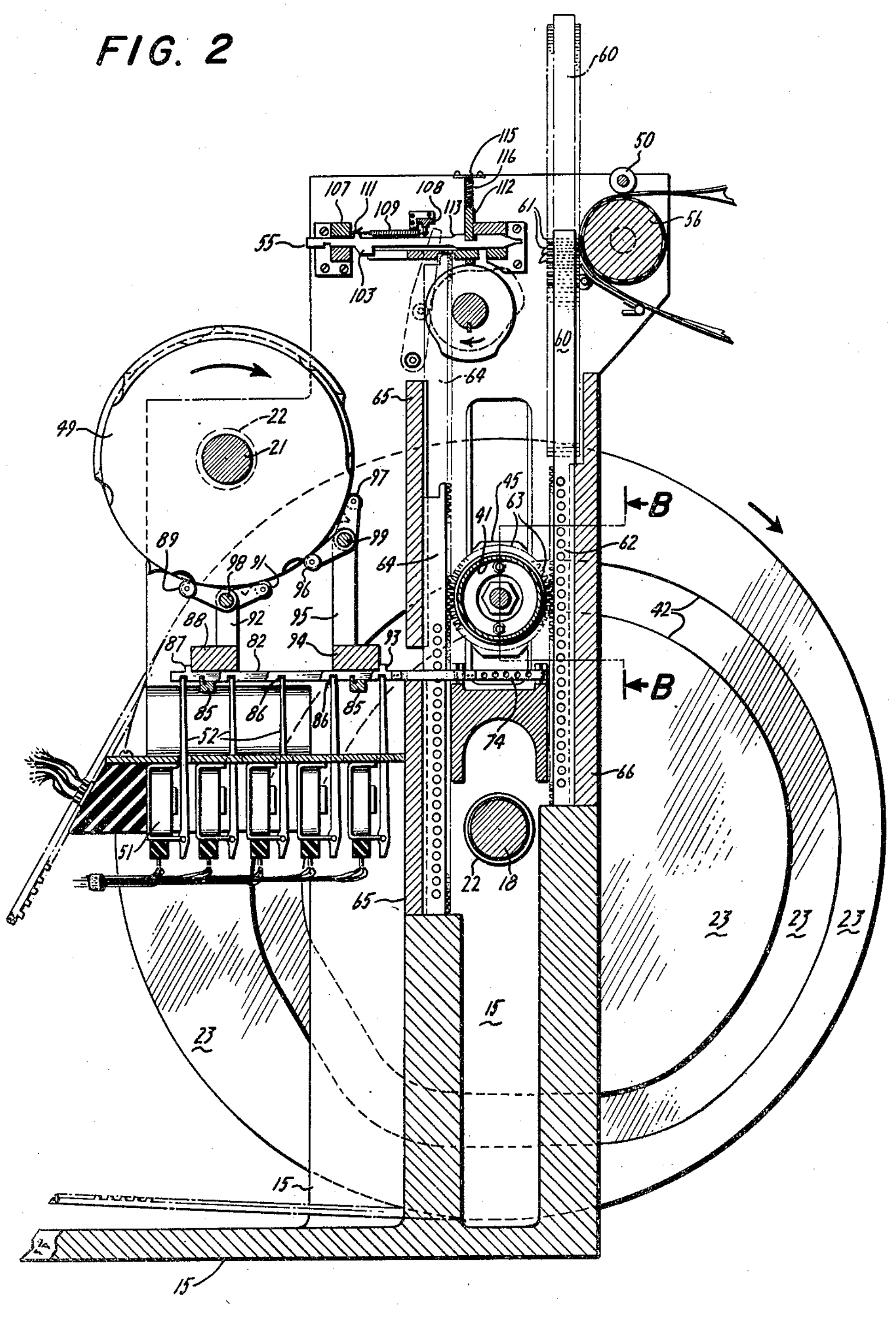
Fig. 2 is a sectional view of Fig. 1 taken at line A—A.

Referring to Fig. 2, a type bar 60 with type slugs 61 and a rack 62 is provided for each print station. A pinion 63 is mounted to rotate freely around the tube 41 in engagement with the rack 62 of the type bar 60. A second rack 64 is provided on the other side of the pinion 63 so that as the tube 41 moves up and down both the racks 62 and 64 will be similarly driven with the tube 41. When either rack 62 or 64 is held stationary while the tube 41 is moving, the other rack which is not held stationary will be forced to move twice the distance of the tube 41. Referring to Fig. 3, the racks 62 are held in vertical alignment by teeth provided in a combed back plate 65, and the type bars 60 are held in similar vertical alignment by teeth in a combed front plate 66. The front and back plates 66 and 65 are supporting members for the side plates 16 and 17 (Figs. 1 and 2) and functionally add rigidity to the printer as well as form guide tracks for the two racks 62 and 64.

The operation of a print station is diagrammatically illustrated in Figs. *4a*, *4b* and *4c* in which pinion 63 is represented by pinion **63*a*, rack 64 is illustrated by rack 64*a*, and rack 62 of the type bar 60 is illustrated by rack 62*a*. The pinion support tube 41 is represented by tube 41*a*. A selecting mechanism 70 is shown between the racks 64*a* and 62*a* so as to be movable to the position of locking either rack 62*a* into position or rack 64*a* into position or, thirdly, to be placed in a neutral position wherein neither rack is locked into position. The groove 42 (Figs. 1 and 2) is arranged with appropriate cam surfacing to cause the tube 41 to rise upwardly in the cut 44 in six steps interrupted by dwells and terminated by a longer dwell. The terminating dwell is then followed by a single fall to bring the tube 41 to a bottom or starting dwell. This cycle is, therefore, repeated for each revolution of the wheel 23. The tube 41**, therefore, starts in the lower position, rises a discrete step, pauses, rises another step and pauses, etc., through a total of six steps, pauses a somewhat longer period and then falls to the starting position. The length of movement for each of the first four steps is twice the distance of the preceding step. The unit of movement for the first step, therefore, is one, for the second step is two, for the third step is four, for the fourth step is eight. The unit of movement of the fifth step is thirteen, and of the sixth step is twenty-six, therefore giving a total of fifty-two individual units of movement. In Figs. *4a*, *4b* and *4c* the selecting mechanism 70 is arranged to disengage or to engage with either bar **62*a* or 64*a* during, and only during, a dwell phase of the cycle. When the select bar 70 is in engagement with the type bar 60** (Fig. *4b*), the type bar 60 is locked into position, which is hereinafter termed "the nonselect condition." In the nonselect condition, upward movement of the tube **41*a* causes the pinion 23*a* to be rotated via the interaction between the pinion 23*a* and the fixed rack 62*a*, therein imparting upward motion to the rack 64*a***.

When the select bar 70 is moved into engagement with the rack **64*a*, hereinafter termed "the select condition," the type bar associated with the rack 62*a*** is free to move (Fig. *4c*), and the rack **64*a* is locked into position. In this arrangement, therefore, a rise of the tube 41*a* will cause the pinion to be rotated via interaction with the rack 64*a*, therein causing the rack 62*a*** and its associated type bar to be moved upwardly therewith.

During the downward stroke, the select bar 70 is placed in the neutral position (Fig. *4a*) wherein the bar 70 is disengaged from both rack **64*a* and rack 62*a*. This is called "the reset condition." During the reset condition the tube 41 is lowered to the starting position. As both racks 64*a* and 62*a* are free to move, the pinion 63*a* forces both racks downwardly with equal force until one or the other shaft meets a bottom stop, and then the pinion 63*a* forces the remaining rack downwardly to the bottom position. As will be hereinafter completely described, the movement of the select bar 70 to either the select or nonselect condition during each cyclic dwell for the succeeding rise will cause discrete positioning of the type bar in order that a predetermined type slug 61 will be in position with its associated type hammer 55**.

Referring to Fig. 5, the tube 41 and the guide block 45 are attached together by bolts 67. The roller 43 is affixed to the tube 41 and the block 45 by a bolt 68 and a nut 69, and the latter are so arranged that an end of the bolt 68 forms an axle upon which roller bearings 80 are provided to support the roller 43. The roller 43 has a diameter approximating the width of the groove 42. The outside diameter of the tube 41 is uniform and is fitted on each end with a primary spacer 71 held on the end of the tube 41 by the two blocks 45. One hundred and twenty pinions 63 are provided to rotate freely around the tube 41 and are held up in spaced apart relationship by interpinion spacers 72. The primary spacers 71 and the interpinion spacers 72 are arranged to provide alignment of the pinions 63 with their coacting racks 62 and 64.

Referring to Fig. 3, a select-nonselect bar 74, as was represented diagrammatically in Figs. *4a*, *4b* and *4c* by selection bar 70, is provided between each rack 62 and 64. A bar 74 is arranged to ride between a lower support member 75 and an upper support member 76. The lower support member 75 is mounted to a cross bracing member 77 which has standards 78 extending upwardly between the bars 74 to support the upper support member 76 and act as a vertical guide for the bars. Springs 79 are mounted to a portion of the cross member 77 and are biased against the bars 74 to provide a constant pressure between the bars 74 and the upper member 76. Each end of each bar 74 is provided with teeth 81 cut at the same angle as the teeth provided on the racks 62 and 64. Bar 74 is sufficiently shorter than the spacing between the two racks 62 and 64 so that it may be centered in a position out of engagement with both racks 62 and 64. A bar driver arm 82 is attached to each bar 74 by two plates 83 which are arranged to go around either side of the rack 62. The arm 82 is guided and supported by two support combs 85.

Referring again to Fig. 2, each of the arms 82 has grooves 86 on the underside thereof adapted to receive one armature 52 of a magnet 51. The grooves 86 are provided at locations to conform with the rows of the coacting magnets 51. The upper side of each arm 82 is provided with a rise 87 which is arranged to coact with a bail 88. The bail 88 runs across the entire row of the arms 82 and is arranged, when actuated, to pull all the arms in a direction away from the center axis of motion of the tube 41. The bail 88 is actuated by a cam follower 89 which rides on the cam 49 and a cam follower 91 which rides on the cam 48. The cams 48 and 49 are arranged in complementary relationship with respect to the location of the two cam followers 89 and 91 so that in timed sequence the cam follower 89 will find a fall while simultaneously the follower 91 will find a rise, therein forcing the bail 88 to move the arm via connecting linkage 92 which is pivoted from a pivot shaft 98 suspended between sides 16 and 17. There is a second rise 93 on each arm 82 which is arranged to coact with a bail 94. The bail 94 is provided with linkage 95 which is pivoted from a pivot shaft 99 suspended between sides 16 and 17 so as to be controlled by a cam follower 96 and a cam follower 97. The cam follower 96 coacts with the cam 47, and the cam follower 97 coacts with the cam 46. The cams 47 and 46 are complementary with respect to the two cam followers 96 and 97 so that a rise on one cam will affect its respective follower, while the other cam will have a fall which will affect its respective follower, therein causing a movement of the two cam followers 96 and 97. Predetermined contours for cams 48 and 49 will therefore cause arms 82 to be pushed backward and predetermined contours on cams 46 and 47 will cause arms 82 to be pushed forward, while energization of a coacting magnet 51 will cause a particular arm 82 to be pulled backward unless the position of the bails 88 or 94 should dictate otherwise.

The bails 88 and 94 and the armature 52 interact together to move arms 82 so as to cause bars 74 to be in either the reset, the select, or the nonselect condition. When the bail 94 moves forward, the bar 74 is moved into the nonselect condition, in engagement with the rack 62. The bail 94, however, is immediately returned to a nonengaging condition after a forward movement; however, the teeth of rack 62 and the teeth 81 are arranged so that they will stay engaged without continued urging by the bail 94 against the rise 93. When a magnet 51 is energized, the coacting arm 82 and associated bar 74 are pulled rearwardly by the armature 52 to cause the bar 74 to engage with the rack 64 and therein be in the select condition. During each cyclic dwell, the bail 94 is arranged to move forward and then rearwardly to cause the bars 74 all to be in the nonselect condition. The bars 74 will remain in the nonselect condition unless the coacting magnet is energized. If the coacting magnet 51 is energized during the dwell, the bar 74 is moved to the select condition and will there remain during the next succeeding cyclic rise of the tube 41. During the final dwell, the bail 88 is arranged to force the arm 82 back, and the bail 94 is arranged to force the arm 82 forward half the normal distance. Both bails thereafter remain with applied opposing pressures to the arm 82 during the downward cyclic phase of the tube 41. This causes the bar 74 to be in the reset condition wherein it is held out of engagement with the racks 62 and 64.

Referring to Fig. 6, the print hammers 55 are held in parallel alignment by teeth and grooves in a mounting 101 and are arranged to align with the type slugs 61 of a coacting type bar 60. A cocking bail 102 is provided on the underside of the print hammers 55 in connecting relation to a lip 103 extending downwardly from the print hammers 55. The bail 102 drives the print hammers 55 backward via a lever 104 urged by a cam follower 105 and a cam 106 on the print hammer cam shaft 19. The bail 102 is spring urged forward by two springs 107 connected between the side plates 16 and 17 and the bail. A print hammer driving spring support member 108 is provided over the print hammers 55 to mount a print hammer spring 109 thereto for each print hammer 55. The other end of each spring 109 is mounted to an upper lip 111 on the rear end of the print hammer 55, therein spring urging the print hammer in the forward direction toward the type bars 60. A print hammer stop bar 112 running the entire length of the row of print hammers 55 is arranged to interpose against an upper ledge 113 on each print hammer 55 to prevent forward displacement of the print hammers 55 while the bar 112 is interposed against the ledge 113. The side plates 16 and 17 are provided with a slot 114 in which the bar 112 is allowed to move vertically. The top of the slot is fitted with a cover plate 115 which holds a spring 116 to bias the bar 112 downwardly. When the cocking bail 102 is moved backward by the cam 106, the ledge 113 is pulled sufficiently to the rear to allow the bar 112 to be interposed against the ledge, therein preventing forward motion of the print hammer irrespective of the position of the bail 102. A cam 117 near the side plate 16 and a cam 118 near the side plate 17 are provided to urge the bar 112 upwardly. When the bar 112 is urged upwardly between cams 117 and 118, the bail clears the ledge 113 therein allowing the print hammers 55 to be driven by the springs 109 forward, therein making contact with type slugs 61. The cams 117 and 118 are slightly out of phase so that the print hammers on one end will be released slightly before the print hammers on the other end of the printer. This is done to lessen shock caused to the various mechanisms which would otherwise occur should the complete row of 120 print hammers be released simultaneously.

The magnets 51 are controlled by pulses through their respective wires within cable 53 by a suitable signal generating device which is arranged to issue pulses at cyclic times during the operation of the printer. The device for controlling the printer is arranged in a timed relationship to the printer so that pulses representing 1, 2, 4, 8, Y and Z values may be generated for each of the wires within cable 53. The value of a pulse is dependent upon the particular timed interval within which the pulse is generated with respect to the operation of the printer.

Referring to Fig. 10, a curve 130 shows the timing relationship for transmittal of the binary pulses to the printer. Blip 131 of curve 130 illustrates the timed interval when the receipt of a pulse indicates a "1" value; blip 132 illustrates the timed interval when the receipt of a pulse indicates a "2" value; blip 133 illustrates the timed interval when the receipt of a pulse indicates a "4" value; blip 134 represents the timed interval when the receipt of a pulse indicates an "8" value; and blips 135 and 136 represent timed intervals when receipt of pulses indicates "Y" and "Z" values respectively. A curve 137 represents the relative motion of the tube 41. The tube 41, as was hereinbefore described, goes through a series of six rises, seven dwells and one fall. The time for the receipt of each pulse representing a binary value occurs during one of six of the dwells. A curve 138 illustrates movement of the bail 94. The bail 94 during each pulse time is arranged to move toward the tube 41 and return again to a normal position. A curve 139 illustrates the movement of the bail 88. A curve 140 illustrates the print hammer movement. A curve 141 illustrates the movement of the bail 102 by the cam 106 to effect a resetting of the print hammers. A curve 142 illustrates movement of the print hammer stop bar 112 by the cams 117 and 118.

In the initial phase of operation, the tube 41 is at the lower position and is retained therein for a timed interval. During that interval the bail 94 moves the bar 74 to the nonselect condition. A "1" value pulse received by magnet 51 at a print station will cause bar 74 to be pulled into the select condition during the initial dwell. Upon termination of the dwell the tube 41 rises, and the type bars 60 for each print station that had received a pulse during the time for a binary "1" pulse will rise with the tube 41. The remaining type bars 60 will remain in position. Upon termination of the rise, a second dwell occurs and the bail 94 forces all bars 74 into the nonselect condition. During the second dwell time a "2" pulse will cause the bar 74 to be moved to the select condition. Following the dwell, the tube 41 rises, taking with it the type bars 60 for the stations in which the bars 74 have been moved to the select condition. In similar fashion, bail 94 moves the bars 74 to the nonselect condition after tube 41 enters a dwell cyclic time so the bars 74 may be moved to the select condition during the timed intervals for numbers 4, 8, Y and Z. After the dwell time for the "Z" pulse, the tube 41 rises and enters a print time dwell. During the print time dwell, bail 94 moves and holds all the bars 74 in the select condition. After the bars 74 are moved to the select condition, the print hammer stop bar 112 is moved upwardly to effect a release of the print hammers 55. Then after the print hammers 55 have all been released, the bail 88 forces the bars 74 rearwardly, and the bail 94 moves to a half position to hold the bars 74 in the reset condition. Following the print time dwell, the tube 41 falls to the start position. During the fall, the bail 102 is forced rearwardly to effect a resetting of the print hammers and the bar 112 falls to lock the hammers 55 in a cocked position. At the termination of the fall, the bail 88 moves forward freeing the bars 74, while at the same time the bail 94 moves the bars 74 to the nonselect condition for the start of a new cycle.

The distance of movement during each rise of the tube 41 is arranged so that a predetermined combination of pulses during the 1, 2, 4, 8, Y and Z times causes the type bars to be in a predetermined position during the print time, therein causing a predetermined character to be in alignment with the print hammer. Such selections are illustrated in Fig. 8. The entire alphabet and numbers 1 through 9 and zero, plus a variety of punctuation marks, may be selected by various combinations of the binary numbers; thus, for example, a signal at binary "1" time with no other signal will cause a type slug with a "1" thereon to be printed. The presence of pulses during the 4, 2, 1 and Z times will cause the type slug with a "*g*" thereon to be in the print position. The remaining characters are set up by the presence and absence of pulses for each printing station during the timed interval for the 1, 2, 4, 8, Y and Z pulses according to the coded graph illustrated in Fig. 8.

In the embodiment as shown, a rack and pinion type of selecting mechanism was employed. In Figs. 9*a* and 9*b* and 9*c* an alternate type of selecting mechanism may be employed with a similar mechanism for its activation. Two drums 160 and 161 are arranged to move in the same manner as the pinion 63 in a vertical plane. The drums are held in a constant spaced apart relation, and stretched therebetween is a tape 162. The tape is provided with a type bar 164 and a print station 165. The tape 162 is freely rotatable around the drums 160 and 161. A selecting mechanism 166 is arranged to hold the tape on the side not occupied by the type bar, and a stop mechanism 167 is arranged to stop the tape on the type bar side of the drums 160 and 161. When the drums 160 and 161 are moved through cyclic phases as was the pinion 63, the type bar 164 moves with the drum. When the stop 167 has been activated, the type bar 164 is in a nonselect condition and remains in position. When the stop 167 is not activated and the selecting mechanism 166 is activated, the type bar 164 is moved upwardly in the same manner as the device hereinbefore described when in the select condition. When during reset neither the stop nor the selecting mechanism is activated, both sides of the tape are movable.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A positioning mechanism having a pair of positionable members, a reciprocating driving means common to said members, means selectively engageable with one or the other of said members for locking it when said driving means moves in one direction, and means for disabling said locking means from both said members when said driving means moves in the other direction.

2. A positioning mechanism having a pair of positionable members, a reciprocating driving means common to and mutually engaging said members, means selectively engageable with either of said members to cause the other said member to be positioned in predetermined increments when said driving means moves in one direction, and means for disabling said locking means from both said members when said driving means moves in the other direction.

3. A positioning mechanism having a pair of positionable members, a reciprocating driving means common to and mutually engaging said members, cam controlled means for moving said driving means in discrete steps, and latching means selectively engageable with one or the other of said members for locking it during predetermined steps of motion.

4. A positioning mechanism having a pair of positionable members, a reciprocating driving means common to and mutually engaging said members, cam controlled means for moving said driving means in discrete steps in a first direction and in a single step in the reverse direction, latching means selectively engageable with one or the other of said members for locking it during predetermined steps of motion in the first direction, and means for disabling said latching means when said driving means is moved in the reverse direction.

5. A positioning mechanism having a first driven member and a second driven member, a driving member to drive said first and second driven members, means moving said driving member in a first direction in discrete increments, means selectively engageable with one or the other of said members for keeping it latched in position during a moving increment, means for moving said driving member in a second direction in a single increment, and means keeping both said driven members unlatched during movement of said driving member in said second direction.

6. A positioning mechanism having a pair of slidable members each having a series of rack teeth, said members being arranged to move in parallel paths, a common gear mutually coacting with the teeth of each said member arranged to cause said members to move in opposite directions, axle means mounting and reciprocally moving said gear in a path parallel to said members, means selectively engageable with one or the other of said members, means for actuating said engaging means at predetermined timing intervals with respect to movement of said axle means to latch said first one of said members, control means for selectively unlatching the first said member and latching the second said member, and means controlled by the direction of travel of said axle means to disable said latching means and said control means.

7. A positioning mechanism comprising a driving member, cam means for driving said member upwardly in discrete increments, a pinion mounted on said member, a positionable member having rack teeth in engagement with said pinion on one side of said driving member, a second positionable member on the other side of said driving member having teeth engaged with said pinion, a locking mechanism selectively engageable with one or the other of said members for locking it during each increment of rise of said driving member whereby each said positionable member rises with said driving member during each increment when said positionable member is in an unlocked condition.

8. A positioning mechanism comprising a driving member, means for driving said member upwardly in discrete increments separated by dwells, a pinion rotatively mounted on said member, a positionable member having rack teeth in engagement with said pinion on one side of said driving member, a second positionable member having rack teeth in engagement with said pinion on a second side of said driving member, a locking mechanism arranged to lock one or the other of said positionable members, means to selectively move said mechanism into locking engagement with said first or second positionable member during a dwell whereby said locked positionable member is unable to rise with said driving member during the following increment of upward motion.

9. A positioning mechanism comprising a driving member, means for driving said member upwardly in discrete increments separated by dwells, a pinion mounted on said member, a positionable member having rack teeth in engagement with said pinion on one side of said driving member, a second positionable member having rack teeth in engagement with said pinion on the other side of said driving member, a locking mechanism arranged to lock one or the other of said positionable members, control means to move said mechanism into locking engagement with said first positionable member during dwells, and control means selectively energizable during said dwells to move said locking mechanism from locking engagement with said first positionable member into locking engagement with said second positionable member whereby said first positionable member is moved with said driving member during increments preceded by control means energization.

References Cited in the file of this patent

UNITED STATES PATENTS

| | | |
|---|---|---|
| 1,863,098 | Borel | June 14, 1932 |
| 1,882,766 | Bryce | Oct. 18, 1932 |
| 1,926,891 | Bryce | Sept. 12, 1933 |
| 1,957,193 | Armbruster | May 1, 1934 |
| 2,027,916 | Lasker | Jan. 14, 1936 |
| 2,076,740 | Mills | Apr. 13, 1937 |
| 2,090,920 | Stuivenberg | Aug. 24, 1937 |
| 2,749,839 | Crowell | June 12, 1956 |